Patented Apr. 29, 1952

2,594,454

UNITED STATES PATENT OFFICE 2,594,454

ORGANIC PHOSPHORUS ACIDS AND ESTERS

Gennady M. Kosolapoff, Dayton, Ohio, assignor to Monsanto Chemical Company, St. Louis, Mo., a corporation of Delaware No Drawing. Application May 31, 1946, Serial No. 673,602

6 Claims. (Cl. 260—461)

This invention relates to a method of producing organic phosphorus-containing compounds, and more particularly to new phosphonic and phosphinic acid and ester products.

Among the present objects of this invention is the provision of phosphorus organic compounds possessing particular value as chemical adjuvants to be added to oils and greases in which their solubility or miscibility in the form of alkali and alkaline earth metal salts renders them particularly valuable. Since sulfur and chlorine may also be introduced into such products, various functions may be accomplished in the modification of lubricants, such as extreme-pressure lubricating qualities and pour-point depression.

The phosphorus-containing products obtained by the present teaching are also useful as plasticizers. In this respect such products have the advantage of being obtainable in a state free of metal salt contaminants.

Compounds of the present invention also possess utility as flotation agents because of their selective wetting action.

Another object of the invention is to secure mono-aromatic phosphorus compounds in considerably greater yield than was possible by prior methods, and to make available the poly-aromatic substituted phosphorus products which could not be obtained satisfactorily by previous methods such as the Friedel-Crafts reaction.

Another object of the invention is to provide phosphorus organic compounds free from aluminum chloride. This compound forms an organic complex normally remaining bound in some degree in Friedel-Crafts reaction products despite the most careful washing. The particular complex of aluminum chloride with phosphine halides is especially troublesome because of the formation of exceedingly stable acid aluminum salts of the resultant phosphinic acids, so that the usual process of hydrolysis fails to obtain the phosphorus acid in yields anywhere near the theoretical.

Aromatic compounds having long side chains are also reacted more successfully by the process here claimed so that products not commercially obtainable by other methods may now be manufactured. Other objects and advantages of the invention will be apparent from the following description:

It has now been found that the reaction of aromatic compounds with phosphorus trichloride, catalyzed by aluminum chloride, may be improved by treatment of the foregoing reaction products with chlorine. Whereas, the direct reaction without chlorine proceeds to yields of 5–25% of mono-aromatic phosphorus compounds with the production of diaromatics only in traces, it has been discovered that the practice of the invention using gaseous chlorine applied to the reaction mixture without the necessity of intermediate purification results in greatly increased yields. I have obtained yields of about 50% to 80% of the esters of mono-aromatic phosphonic acid and up to 30% of the diaromatic derivative. The chlorination process may be carried out in the presence of a solvent indifferent to chlorine. The improvement of this invention is not merely to increase the valence of the phosphorus (since the concurrent result is also to provide unobviously greater yields of the aromatic derivatives), but also to provide a satisfactory method for cleavage of the aluminum chloride complex.

Chlorination may be carried to the stage of transforming the trivalent phosphorus to pentavalent phosphorus. The chlorination may be continued, if desired, to effect further addition or substitution. However, the expression of chlorinating to saturation in practical terminology means the addition of sufficient free chlorine to bring about the change in the valence of the phosphorus, as shown by the sudden decrease in the rate of absorption of chlorine supplied.

In the separation of the pentavalent phosphorus compounds I may form esters or thio esters by the use of alcohols or mercaptans, respectively. The esters or thio esters have the advantage of providing compounds which, particularly in the lower members of the series, permit the product to be removed by distillation. The alcohols or mercaptans may be of any of the typical members such as methyl, ethyl, propyl, isopropyl, n-butyl, isobutyl, sec.-butyl, tert.-butyl, n-amyl, isoamyl, tert.-amyl, n-hexyl, cyclohexyl, n-octyl, capryl, n-recyl, lauryl, myristyl, cetyl, stearyl and benzyl.

The specific disclosure of the mercaptan compounds is presented in my copending application Serial No. 673,601, filed May 31, 1946.

The hydrocarbons contemplated for reaction to form a substituted phosphorus-hydrocarbon bond with phosphorus trichloride in the initial reaction may be aliphatic or aromatic. As representative of the latter, there may be employed benzene, halo benzenes, dodecyl benzene, wax benzene, naphthalene, wax naphthalene, terphenyls, etc. The terphenyls may include pure compounds or mixtures commercially obtained as shown in U. S. Patent 2,344,258.

The products contemplated in the present disclosure comprise alkyl and aromatic derivatives of PCl₅ and the acids,

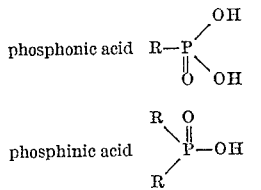

and esters of these compounds. The sulfur derivatives corresponding to these compounds are,

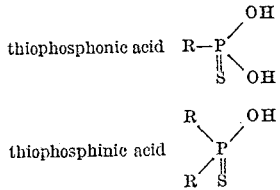

and thio esters of these compounds where R is an alkyl or aryl radical, which may be further substituted.

The following examples illustrate the general procedure and type of reaction with which the invention is concerned, without, however, limiting the invention to the precise methods disclosed.

*Example 1*

Preparation of benzenephosphonates.—I reacted 16 g. benene (2 mols), 822 g. phosphorus trichloride (6 mols) and 133 g. (1 mol) anhydrous aluminum chloride. These materials were mixed and gently refluxed with the exclusion of moisture for 36 hours when reaction was complete. The flask was equipped with a sealed stirrer and a distillation head and the excess phosphorus trichloride then removed under moderate vacuum with stirring at 50°. The residual, reddish mass was diluted with 500 cc. of dry sym.-tetrachlorethane and the solution was treated with a moderate stream of dry chlorine which was introduced under the surface of the solution with stirring and external cooling by means of an ice bath. The absorption of chlorine required 2¼ hours, at which point the unused chlorine began to escape from the solution. Dry air was then drawn through the solution for 30 minutes to remove the excess chlorine. The gas inlet tube was then replaced by a dropping funnel and 460 g. (10 mols) of dry ethanol was added dropwise to the solution with stirring and efficient ice cooling while the flask was under moderate vacuum. The addition required two hours. The resulting clear, yellowish solution was allowed to stand overnight and was then precipitated on ice. The organic layer was later separated and was washed thoroughly by two changes of dilute hydrochloric acid and water. The last wash was free of aluminum ions.

Distillation, after the removal of solvent, gave 210 g. of crude diethylbenene phosphonate, B. P. 130–60° at 6 mm., 49 g. of crude ethyl bis-benzenephosphinate, B. P. 160–205° at 6 mm. and an undistillable crystalline residue. Redistillation gave 208 g. diethylbenzenephosphonate, B. P. 117–8° at 1.5 mm., $n_D^{25}$ 1.4935 and 26 g. of ethyl bis-benzenephosphinate, B. P. 173–5° at 1.5 mm., $n_D^{25}$ 1.5632. The yields were, therefore, 48.6% of the mono- and 10.5% of the bis-benzene derivatives.

The esters are colorless liquids almost odorless, but of a pleasant odor as contrasted to phosphine derivatives. Refluxing of the diethylbenzenephosphonate with concentrated acid, such as HCl, followed by evaporation to dryness gave a substantially quantitative yield of benzenephosphonic acid, M. P. 158–9° from water. The corresponding ethyl bis-benzenephosphinate was completely hydrolyzed in this manner in the course of two hours with the formation of crystalline bis-benzenephosphinic acid, M. P. 186–8°, which, on crystallization from ethanol, melted at 190.5–192°.

Repetition of the run, using molar proportions of aluminum chloride, gave 58% diethylbenzenephosphonate, 19% ethyl bis-benzenephosphinite and 10% crude bis-benzenephosphinic acid, M. P. 178–181° for a total of 87% utilization of benzene.

*Example 2*

To prepare the mono-chlorobenzene substituted phosphorus chloride and esters of the acid, I reacted 450 parts chlorobenzene, 600 parts PCl₃ and 90 parts AlCl₃ under reflux for 40 hours. The excess PCl₃ was removed and chlorination of the residue with ice cooling was carried out in 200 parts of sym.-tetrachlorethane, chlorine being added to saturation. After removal of excess chlorine 1260 parts of butanol was added with the resultant evolution of HCl. The organic material was poured on a mixture of ice and HCl and the butyl esters were washed free of aluminum salts. The yield was 30.6% of butyl bis-p-chlorobenzenephosphinate, B. P. 227–8° at 5 mm. and 16.6% of dibutyl p-chlorobenzenephosphonate, B. P. 188° at 5 mm.

The ethyl esters were also prepared by the use of ethyl alcohol in place of the butanol employed above. The compounds so obtained were a colorless liquid, diethyl p-chlorobenzenephosphonate, B. P. 137–40° at 3 mm., $n_D^{25}$ 1.5047, $d_4^{25}$ 1.1990 and a viscous, pale, yellowish oil, ethyl bis-p-chlorobenzenephosphinate, B. P. 202–6° at 3 mm., $n_D^{25}$ 1.5848, $d_4^{25}$ 1.2942. Hydrolysis of the esters gave the solid p-chlorobenzenephosphonic acid, M. P. 183–4°, recrystallized from water.

*Example 3*

Another run was made using the same reactants, but in such proportions as to increase the yield of the mono- substituted compound. The charge was 112.6 parts of chlorobenzene, 200 parts of AlCl₃ and 549.4 parts of PCl₃. Reaction was accomplished as in the preceding example to yield the esters as 195 parts (73.7% yield) of diethyl p-chlorobenzenephosphonate and 37.8 parts of ethyl bis-p-chlorobenzenephosphinate.

*Example 4*

Preparation of 2,5-dichlorobenzene phosphonates.—I reacted 294 parts p-dichlorobenzene, 89 parts AlCl₃ and 824 parts of PCl₃ under reflux. The excess PCl₃ was removed, and chlorination of the residual material to add 45.5 parts chlorine was carried out in the cold in 300 parts of solvent. The reaction product was esterified with 461 parts of ethanol and precipitated on a mixture of ice and HCl. The products included the compound, diethyl 2,5-dichlorobenzenephosphonate, a colorless liquid, B. P. 160–4° at 3 mm., $n_D^{25}$ 1.5105. The ester was then hydrolyzed by refluxing with concentrated HCl, and the separated acid filtered off and recrystallized to give a product having a melting point of 192–5.5° and readily soluble in alcohol. Analysis gave 12.75% P and 30.4% Cl; theory, 13.65% P, 31.24% Cl.

Example 5

*Ethylbenzene derivative of phosphonic acid.*—
75 g. of ethylbenzene, 100 g. of PCl$_3$ and 30 g. of AlCl$_3$ were refluxed with exclusion of moisture for 24 hours. Low boiling materials were topped off under reduced pressure and the residual liquid was mixed with 200 cc. of carbon tetrachloride. The solution was divided into halves. (a) With stirring and ice cooling chlorine was passed into the solution until a 16 g. weight gain was achieved. The mixture was then poured into ice water with stirring to precipitate the organic compound and the mixture was then distilled under reduced pressure at 70°. After cooling, 12 g. of a white solid, soluble in alkali, was filtered off. The water solution was concentrated to crystallization and yielded crude ethylbenzene-phosphonic acid, M. P. 164–6° as fine, colorless needles. (b) 39 g. of chlorine was dissolved in 30 cc. of carbon tetrachloride and the solution was added over a fine minute period to the second half of the reaction mixture with stirring and cooling. After treatment as above, the same alkali-soluble, infusible solid and the corresponding phosphonic acid were obtained.

Example 6

*Preparation of dodecyl benzenephosphonic acids.*—I reacted 225 g. dodecyl benzene (commercial grade, largely comprised of side chains with twelve carbon atoms) and 370 g. PCl$_3$ and 42 g. AlCl$_3$. After refluxing, the excess PCl$_3$ was removed and 500 cc. tetrachlorethane was added to the remaining material and chlorination carried on to saturation, amounting to 50 g. of chlorine. The butyl ester was formed by adding 370 g. of butanol and the product was separated by pouring on a mixture of ice and HCl. The ester was hydrolyzed by refluxing with HCl to give a yield of 78.7%, based on mono-aromatics, the final ester product being a heavy, brown, translucent liquid, which analyzed 5.86% P, 6.17% P. The charge of 311 g. of butyl esters was hydrolyzed to give 241 g. of dodecyl benzenephosphonic acids.

Example 7

*Preparation of alkyl naphthalene phosphonates.*—I reacted 387 g. of alkyl naphthalene (commercial grade alkylation product of chlorinated wax and naphthalene by the Friedel-Crafts reaction), 181 g. PCl$_3$ with 21 g. AlCl$_3$ under reflux. Chlorination of the aromatic phosphine residue was carried on in 500 cc. of tetrachlorethane and after removing free chlorine, the butyro ester was formed at ice temperature with 500 g. of dry butanol. The ester mixture was also hydrolyzed to obtain 320 g. of the free acid, the final product being an almost black-brown solid mixture of the mono- and di-substituted phosphonic acids of alkyl naphthalene.

Example 8

*Preparation of alkylbenzene phosphonic acids.*—I charged 700 g. alkylbenzene (commercial alkylation product of chlorinated wax condensed by the Friedel-Crafts reaction with benzene) with 412 g. PCl$_3$ and 46.7 g. AlCl$_3$ under reflux. After the organic phosphine was diluted with 1175 cc. of tetrachlorethane, dry chlorine was added with ice cooling until absorption ceased. To form the ester, 400 g. of butanol were added and the mixture was poured on a mixture of ice and HCl and the resulting organic layer separated. The butyl esters of alkylbenzene phosphonic acids were obtained in the form of a light brown, low melting solid. A portion of the esters was hydrolyzed by HCl and the acids found to be a brown, low melting solid, which analyzed 3.43% P.

*Preparation of metal salts of dialkylbenzene-phosphonates.*—The product of this example was reacted with barium hydroxide octahydrate by refluxing in xylene for several hours, and was then filtered hot by suction. The filtrate, when freed of solvent, gave a waxy, brown solid identified as the barium salt of dialkylbenzenephosphonates.

Example 9

*Phosphonic lubricating oil derivative.*—I reacted 450 g. of SAE 30 uninhibited lubricating oil (comprising paraffinic hydrocarbons containing some naphthenic hydrocarbons), 617 g. PCl$_3$ and 66.7 g. AlCl$_3$ with exclusion of moisture. After removal of excess PCl$_3$, the product was dissolved in 450 cc. of tetrachlorethane and chlorine added until 159 g. of chlorine had combined. Esterification was then carried out using 370 g. of butanol, and a separation of the organic material was made by pouring the mixture on ice and HCl. The product, comprising the butyl esters of paraffinic hydrocarbon) phosphonic acids, was obtained as a dark brown oil and a semi-solid which separated out. The fluid product was found to analyze 3% phosphorus, and the solid portion 8% phosphorus. Hydrolysis of the ester gave the phosphonic acid by boiling with HCl. The product was a viscous, brown material; 5.8% phosphorus by analysis.

Example 10

*Phosphonic derivative of a kerosene cut of aliphatic hydrocarbons.*—The kerosene used was a narrow petroleum distillate boiling in the range of 176–196° and with $n_D^{25}$ 1.4302. This material was calculated to have a composition averaging C$_{12}$H$_{26}$, although it comprised paraffin hydrocarbons from C$_{12}$H$_{26}$ to C$_{16}$H$_{34}$ with some olefinic and naphthenic constituents also being present.

I used 114.5 g. of the above kerosene, 45.3 g. AlCl$_3$ and 371 g. of PCl$_3$. The charge was refluxed for 40 hours, after which excess PCl$_3$ was removed by vacuum. The residual, yellow mass was dissolved in 250 cc. of tetrachlorethane and was chlorinated with ice cooling until no further chlorine was taken up, after which excess chlorine was drawn from the liquid by means of a stream of dry air. Esterification was accomplished by the addition of 134 g. of ethanol with ice cooling under vacuum. The aluminum chloride in the esters was also hydrolyzed by means of ice and were washed thoroughly and the organic layer concentrated under reduced pressure to obtain the ethyl alkylphosphonates as a yellowish, viscous liquid, which, after hydrolysis by HCl, gave 46 g. of alkylphosphonic acid as a viscous, brown mass readily soluble in alkali and also soluble in lubricating oil.

Other Friedel-Crafts catalysts well known in the art, such as AlBr$_3$, may be employed in place of aluminum chloride, but the low cost of this latter material makes it preferable as a catalyst.

It is evident from the foregoing examples that my process will produce products not obtainable by the prior art Friedel-Crafts reaction, but will also produce new and useful results not heretofore recognized as obtainable.

It is, of course, in the light of the present disclosure, now feasible to make various modifications in the operation which has been described above. Although the reaction as described is brought about at atmospheric pressure, it is quite possible to use higher or lower pressures. When the higher pressure is used, a pressure vessel may be employed and higher reaction temperatures used. With such extreme conditions, reaction takes place even more readily and modifications may be made to obtain preferential quantities of one or the other reactant by altering the proportions of reactants used. However, I have found that the step of heating is not always necessary, but aids in the acceleration of the chemical reaction to form the phosphorus-organic derivative.

What I claim and desire to secure by Letters Patent of the United States is:

1. The method of preparing a phosphorus-containing organic compound which comprises mixing a hydrocarbon with phosphorus trichloride and an aluminum halide, and then adding chlorine to said mixture.

2. The method of preparing a phosphorus-containing organic compound which comprises mixing a hydrocarbon with phosphorus trichloride, and aluminum chloride, heating and then chlorinating said mixture with elemental chlorine.

3. The method of preparing a phosphorus-containing organic compound which comprises reacting an aromatic hydrocarbon with phosphorus trichloride and aluminum chloride, chlorinating said mixture with elemental chlorine to decompose complexes, and separating the phosphorus-containing compounds.

4. The method of preparing a phosphorus-containing organic ester which comprises reacting a hydrocarbon with phosphorus trichloride and aluminum chloride, chlorinating the same with elemental chlorine, and esterifying the phosphorus-containing compound.

5. The method of preparing a phosphorus-containing organic compound which comprises reacting an aromatic hydrocarbon with $PCl_3$ and $AlCl_3$ to form trivalent phosphorus compounds and complexes of the same with $AlCl_3$, chlorinating said mixture with elemental chlorine in the presence of a solvent to decompose said complexes and to form pentavalent phosphorus derivatives, and separating the mono- and diaromatic phosphorus compounds.

6. The process for preparing aryl substituted pentavalent phosphorus acids which comprises reacting an aromatic hydrocarbon with phosphorus trichloride and aluminum chloride, chlorinating the same with elemental chlorine to obtain pentavalent phosphorus compounds, esterifying and separating the phosphorus acid esters, and hydrolyzing to obtain the free acids.

GENNADY M. KOSOLAPOFF.

REFERENCES CITED

The following references are of record in the file of this patent:

UNITED STATES PATENTS

| Number | Name | Date |
|---|---|---|
| 2,137,792 | Woodstock | Nov. 22, 1938 |
| 2,347,633 | Kosolapoff | Apr. 25, 1944 |

OTHER REFERENCES

Kelbe, "Berichte deutsch. chem. Ges.," vol. 9 (1876), pp. 1051–1052.

Michaelis (I), "Ber. deutsch. chem. Ges.," vol. 15 (1882), page 801.

Michaelis (II), "Liebig's Annalen der Chemie," vol. 293 (1896), pp. 196–200, 204, 223–226.

Michaelis (III), "Liebig's Annalen der Chemie," vol. 294 (1897), pp. 48–53.